United States Patent
Gavvala et al.

(10) Patent No.: US 12,541,415 B2
(45) Date of Patent: Feb. 3, 2026

(54) MANAGEMENT AND RECOVERY OF PERIPHERAL DEVICES DURING HOST SYSTEM CRASHES

(71) Applicant: Dell Products L.P., Round Rock, TX (US)

(72) Inventors: Pavan Kumar Gavvala, Bangalore (IN); Sandesh Hadhimane Balakrishna, Bangalore (IN); Ajeesh Kumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/785,428

(22) Filed: Jul. 26, 2024

(65) Prior Publication Data

US 2026/0030087 A1    Jan. 29, 2026

(51) Int. Cl.
| | |
|---|---|
| G06F 11/00 | (2006.01) |
| G06F 1/30 | (2006.01) |
| G06F 11/07 | (2006.01) |
| G06F 11/30 | (2006.01) |

(52) U.S. Cl.
CPC ............ *G06F 11/0772* (2013.01); *G06F 1/30* (2013.01); *G06F 11/3051* (2013.01)

(58) Field of Classification Search
CPC ..... G06F 11/0772; G06F 11/3051; G06F 1/30
See application file for complete search history.

(56) References Cited

U.S. PATENT DOCUMENTS

| | | |
|---|---|---|
| 5,339,404 A | 8/1994 | Vandling, III |
| 5,740,429 A | 4/1998 | Wang |
| 7,418,545 B2 | 8/2008 | Marushak |
| 7,865,775 B2 | 1/2011 | Yao |
| 7,974,286 B2 | 7/2011 | Keohane et al. |
| 10,416,988 B1 | 9/2019 | Kulchytskyy |
| 2003/0182577 A1 | 9/2003 | Mocek |
| 2008/0059720 A1 | 3/2008 | Rothman |
| 2011/0119686 A1 | 5/2011 | Chen |
| 2014/0195684 A1 | 7/2014 | Taaghol |

(Continued)

OTHER PUBLICATIONS

Cycuity, "Detect and Prevent Security Vulnerabilities in your Hardware Root of Trust," 2022. Web Page <https://cycuity.com/wp-content/uploads/2022/06/Cycuity_White-Paper_Detect-Security-Vulnerabilities-HRoT.pdf> accessed on Jul. 23, 2024 (17 Pages).

(Continued)

*Primary Examiner* — Philip Guyton
(74) *Attorney, Agent, or Firm* — WOMBLE BOND DICKINSON (US) LLP

(57) ABSTRACT

Methods and systems for managing a peripheral device of a data processing system are disclosed. When a data processing system crashes, all hardware components of the data processing system including any connected peripheral devices are abruptly shut down as a result of the crash. These components may still be running vital processes that could become corrupted as a result of the abrupt shutdown. These components may also be damaged physically as a result of the abrupt shutdown. A management controller may be provided to gracefully shutdown these components when the data processing system experiences a crash, specifically during a crash of a system host of the data processing system.

20 Claims, 11 Drawing Sheets

(56) References Cited

U.S. PATENT DOCUMENTS

| | | |
|---|---|---|
| 2014/0258526 A1 | 9/2014 | Le Sant |
| 2015/0304343 A1 | 10/2015 | Cabrera |
| 2018/0011524 A1* | 1/2018 | Stumpf ............... G06F 11/0793 |
| 2020/0044868 A1 | 2/2020 | Vakulenko |
| 2020/0218527 A1 | 7/2020 | Ganesan |
| 2021/0042062 A1 | 2/2021 | Betusno |
| 2023/0315485 A1* | 10/2023 | Paulraj .................. G06F 1/3246 |
| | | 713/2 |
| 2023/0376575 A1 | 11/2023 | Anzai |
| 2024/0054039 A1 | 2/2024 | Srinivasan |

OTHER PUBLICATIONS

Elmaghbub, Abdurrahman, et al., "Domain-Agnostic Hardware Fingerprinting-Based Device Identifier for Zero-Trust IoT Security," IEEE Wireless Communications 31.2 (2024) (7 Pages).

Rostami, Mohamadreza, et al. "Beyond random inputs: A novel ml-based hardware fuzzing." 2024 Design, Automation & Test in Europe Conference & Exhibition. IEEE. (2024) (6 Pages).

Gaikwad, Pravin, et al. "Third-party hardware IP assurance against Trojans through supervised learning and post-processing." arXiv preprint arXiv:2111.14956. IEEE. (2021) (13 Pages).

\* cited by examiner

MANAGEMENT AND RECOVERY OF PERIPHERAL DEVICES DURING HOST SYSTEM CRASHES

FIELD

Embodiments disclosed herein relate generally to data processing system management. More particularly, embodiments disclosed herein relate to systems and methods to manage and recover one or more peripheral devices connected to a data processing system when the data processing system crashes.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components and the components of other devices may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

Figure 4:
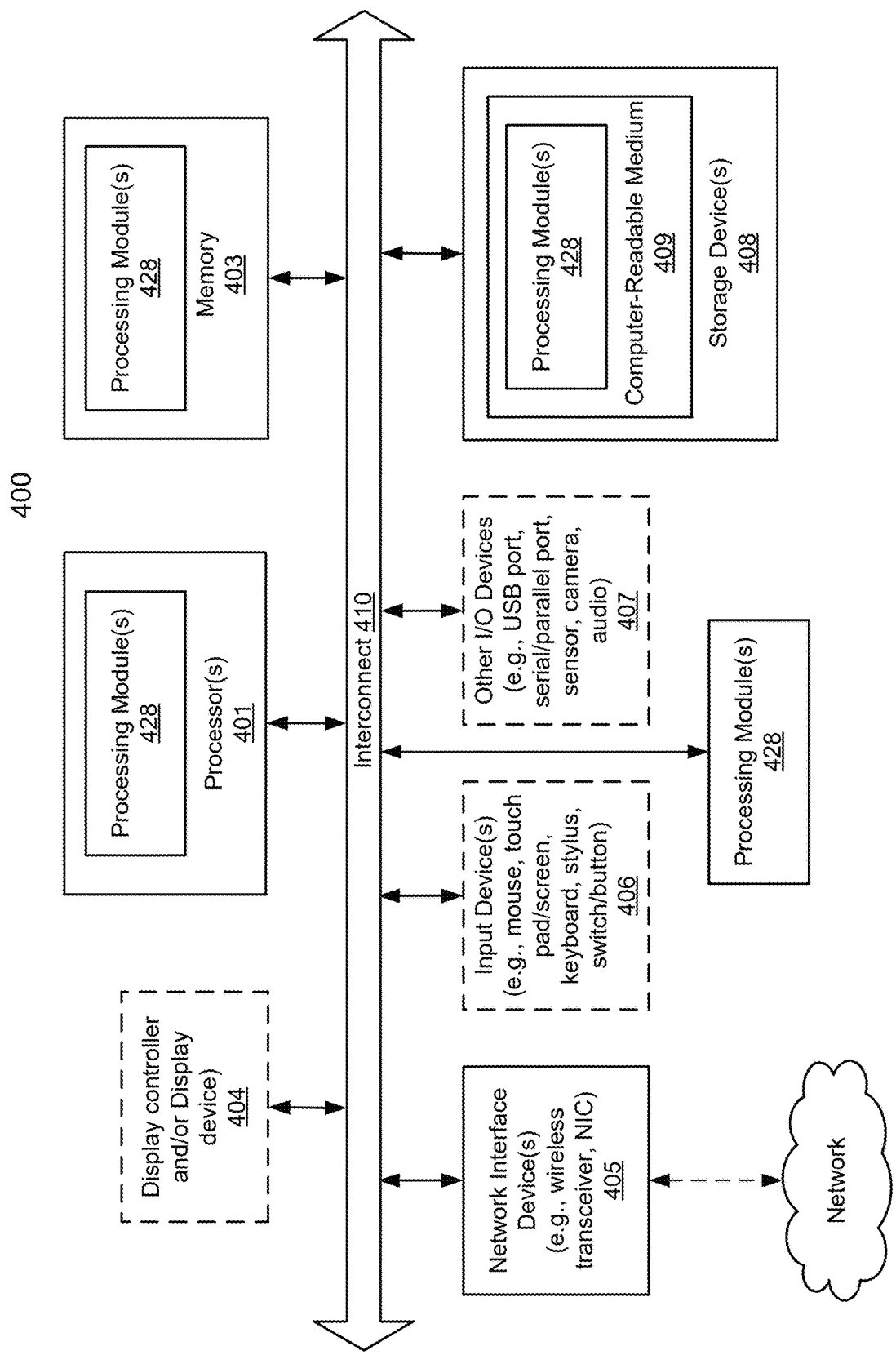
FIG. 4 shows a block diagram illustrating a computing device in accordance with one or more embodiments.

In general, embodiments disclosed herein relate to methods and systems for managing one or more peripheral devices connected to (e.g., installed within or externally connected to) a data processing system (such as computing devices, as described below in reference to FIG. 4). Peripheral devices may include any type of add-on and/or expansion components (namely, hardware components) such as channel cards (e.g., a fiber channel card, or the like), network interface cards (NICs), graphical processing units (GPU), data processing units (DPUs), digital signal processors (DSPs), or the like.

In one example, a peripheral device may be a radio access network (RAN) DPU. Such RAN DPUs may be cloud-based RAN devices that are crucial hardware components for enhancing telecom networking capabilities of a data processing system (e.g., a data processing system configured as a server or the like). Such RAN DPUs may be used in Cloud-RAN architectures that advantageously centralize radio access networks using cloud computing technology.

However, data processing systems may fail. For example, a system host (e.g., a host operating system (OS)) of the data processing system may unexpectedly fail (e.g., crash) during operation of the data processing system. When the system host fails, components (e.g., hardware and software components including connected peripheral devices) of the data processing system are all abruptly shut down (e.g., a hard shutdown) as a result. The abrupt shutdown occurs before (e.g., prior to) any of these components can complete any currently running processes.

Such abrupt shutdowns also result in various issues including, but not limited to: (i) data corruption or loss, particularly if any processes, services, and/or operations (e.g., performed as part of the data processing systems' functions of providing computer-implemented services to users) are still running when the abrupt shutdown occurred; (ii) such abrupt termination of all running processes, services, and/or operations results in system instability and possible file system damage; (iii) frequent abrupt shutdowns to a hardware component could degrade that hardware component over time, resulting in frequent replacement of the component; (iv) the long-term health of the data processing system and peripheral devices could deteriorate due to these abrupt shutdowns. Such failures to one data processing system within a deployment (e.g., a collection of one or more data processing systems) could also negatively impact and disrupt the operations of other data processing systems that work collectively with the data processing system that has failed.

Figure 1A:
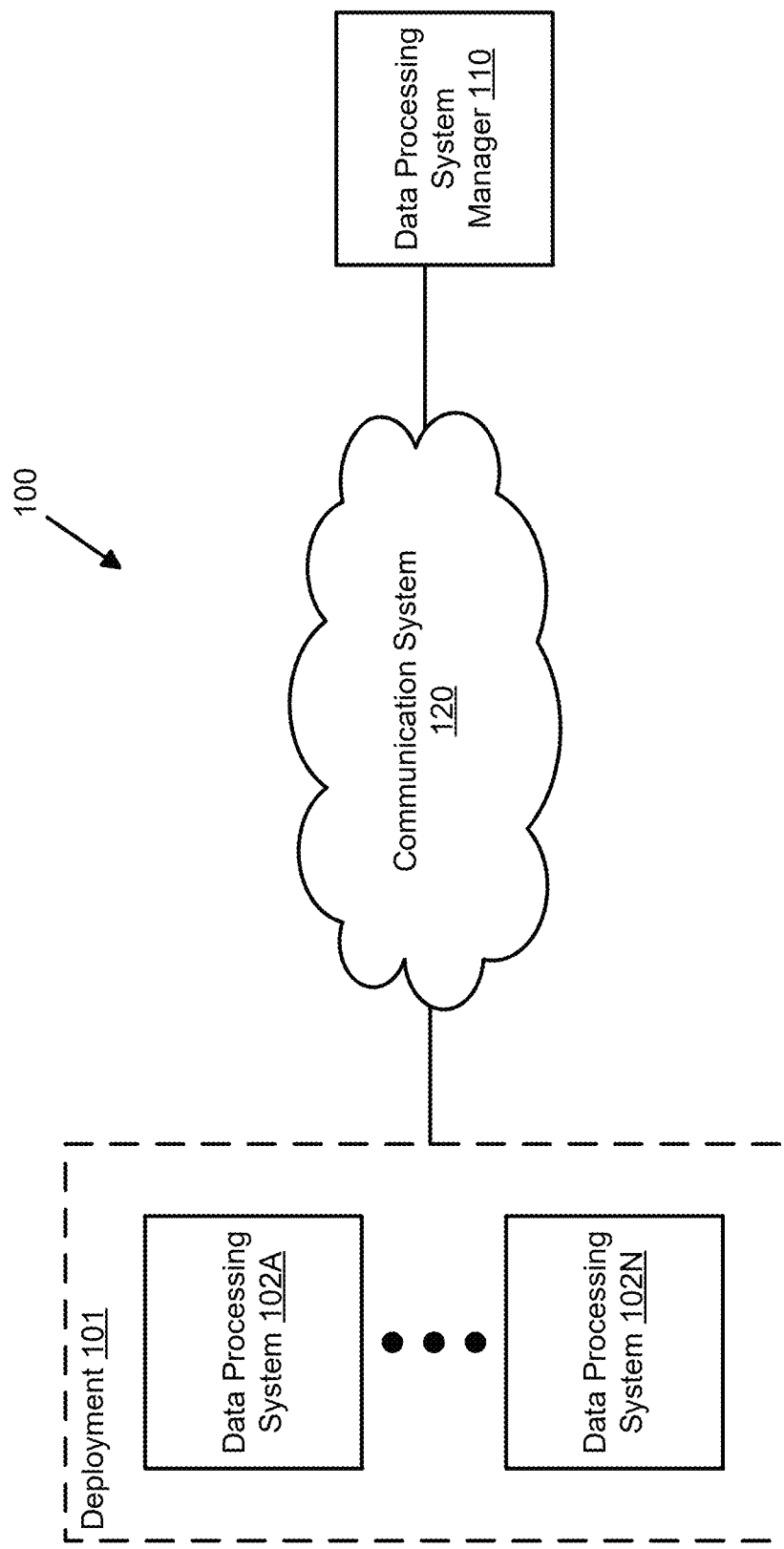
FIG. 1A shows a block diagram illustrating a system in accordance with one or more embodiments.
Figure 1B:
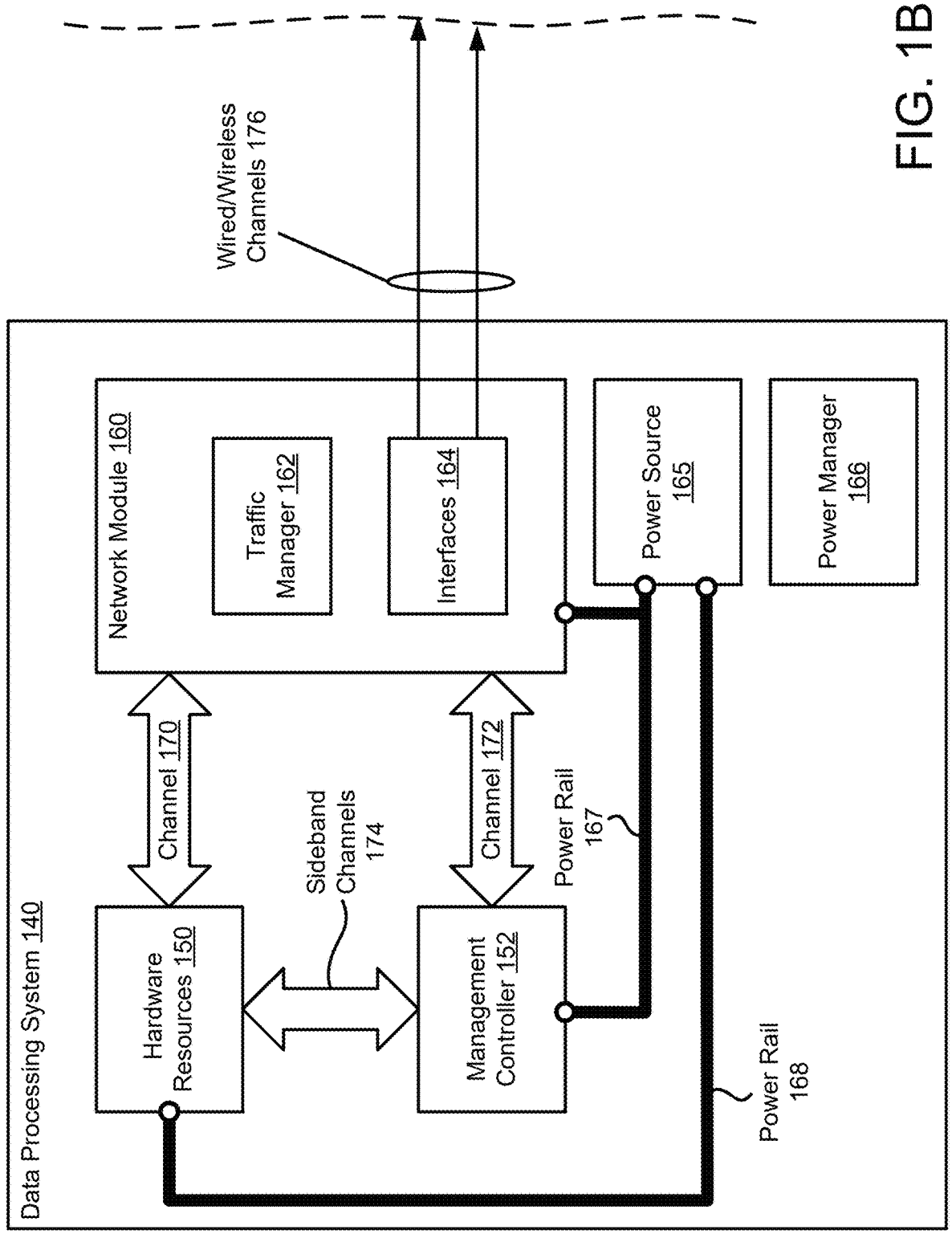
FIGS. 1B-1D show block diagrams illustrating a data processing system in accordance with one or more embodiments.
Figure 1C:
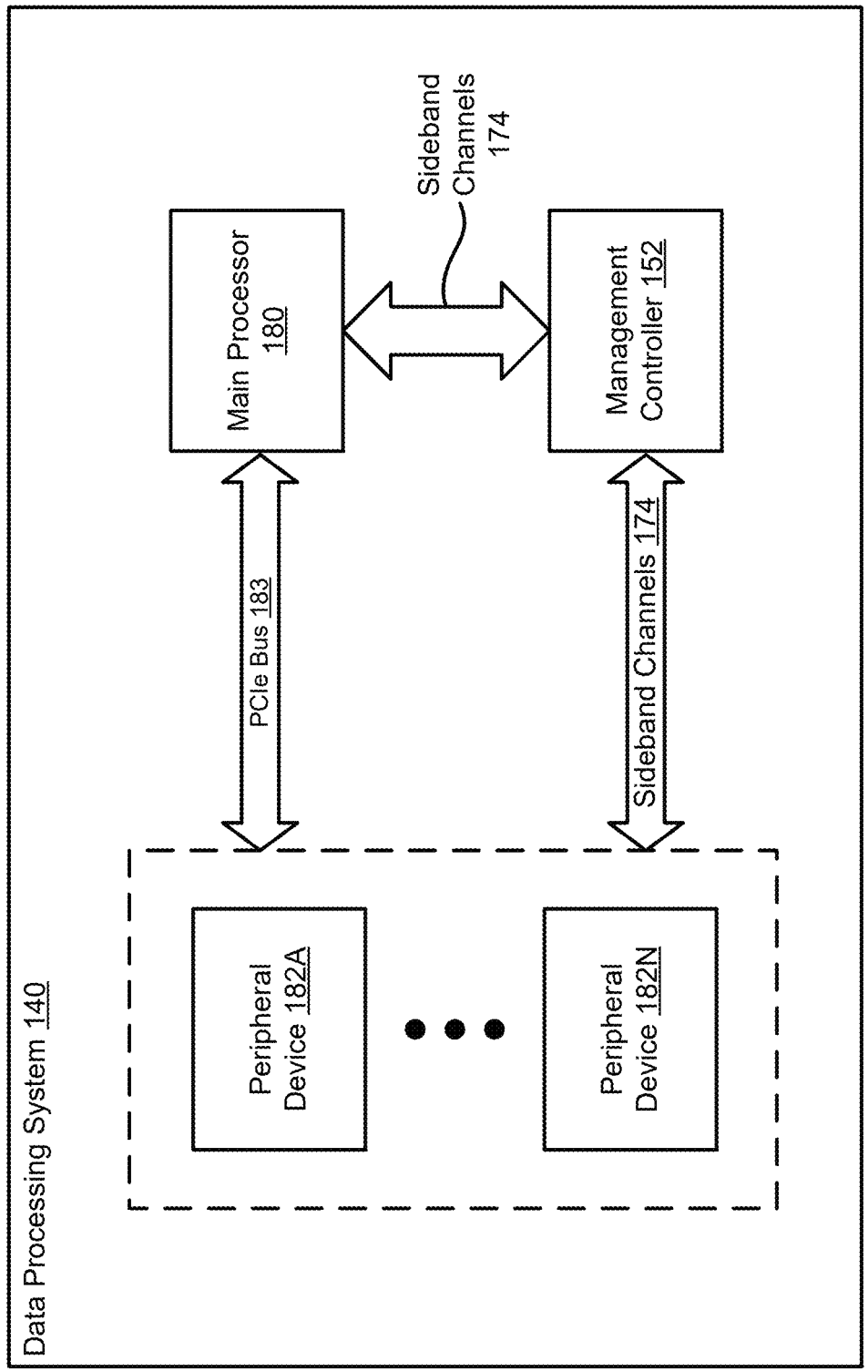
Figure 1D:
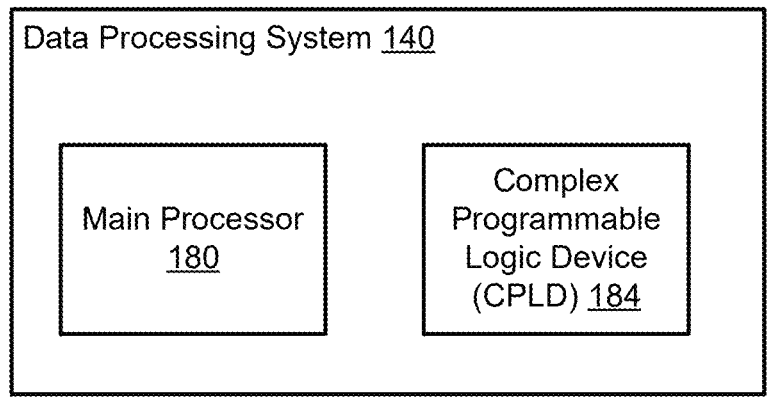

To resolve the above issues regarding failures of data processing systems (namely, system host failures) causing unwanted and damage-inducing abrupt shutdowns to components of the data processing systems (namely, peripheral devices connected to the data processing systems), a management controller (e.g., a baseboard management controller (BMC) in the form of a microcontroller, or the like as discussed in more detail before in reference to FIGS. 1B and 1D), may be installed within the data processing system to independently (from the data processing system) manage the peripheral devices during a system host failure.

In particular, the management controller may first determine whether any peripheral devices connected to a data processing system contains its own operating system (OS). For such peripheral devices with their own OS, the management controller may cause the data processing system to change a peripheral device power configuration associated with these peripheral devices such that host power (e.g., from one or more power supplies of the data processing system) (also referred to herein as "host system power") provided to these peripheral devices is not abruptly cut off when a system host failure (e.g., a host OS crash) occurs.

The management controller may then utilize this chance to instruct the peripheral devices with their own OSs to perform graceful shutdowns to allow the OSs of these peripheral devices to perform tasks for safely shutting down currently running processes and closing connections. Once the management controller has confirmed that the OSs of these peripheral devices have been gracefully shutdown, the management controller may then cause the data processing system (that is still in the host system failure) to power off these peripheral devices (e.g., stop providing host power to these peripheral devices) as part of starting the data processing system's own graceful and/or hard shutdown process(es) to resolve (e.g., recover the data processing system from) the host system failure.

As a result, embodiments disclosed herein may provide, among others, an improvement (e.g., a technical improvement) to the above-discussed issues failures of data processing systems (namely, system host failures) causing unwanted and damage-inducing abrupt shutdowns to components of the data processing systems (namely, peripheral devices connected to the data processing systems). In particular, an improved mechanism, by way of the management controller providing a new mechanism (which was previously unavailable), for gracefully shutting down these peripheral devices to prevent unwanted disruptions and damages to these peripheral devices is now available to the data processing system (and to the peripheral devices).

Such improvements may also directly translate to improvements to the functionalities (e.g., computer functionalities) of the data processing systems and their connected peripheral devices. By preventing such damage-inducing abrupt shutdowns to components of the data processing systems (namely, peripheral devices connected to the data processing systems), the life and health of these components may be extended. Additionally, data corruption or loss in these components may be directly prevented by allowing these components to perform the graceful shutdown such that limited computing resources (e.g., limited processing and memory resources) do not need to be wasted on recovering such corrupted or lost data once the peripheral device is powered again after a restart and/or reset of the data processing system.

Said another way, by preventing abrupt shutdowns, the functionalities of these components of the data processing systems (namely, of the peripheral devices connected to the data processing systems) are directly improved as data corruption or loss, potential file system damage, hardware durability maintenance, and long-term device health deterioration to these components as a result of the abrupt shutting down of these components are effectively prevented using the method and processes of embodiments disclosed herein.

In an embodiment, a method for managing a peripheral device of a data processing system is provided. The method may include: obtaining, by a management controller of the data processing system, an indication specifying a change in a state of an operating system (OS) of the data processing system that would cause an abrupt powering off of the peripheral device; and causing, by the management controller, the peripheral device to perform a graceful shutdown of the peripheral device while preventing the abrupt powering off of the peripheral device as a result of change in the state of the OS of the data processing system.

The change in the state of the OS of the data processing system comprises at least a failure of the OS and a graceful shutdown of the OS.

The management controller is a microcontroller installed within the data processing system that operates independently of a central processing unit (CPU) of the data processing system, and the peripheral device is a data processing unit (DPU).

The management controller communicates with and causes the peripheral device to perform actions using an inter-integrated circuit (i2c) communication interface between the management controller and the peripheral device, the actions comprising the graceful shutdown of the peripheral device.

The indication is received by the management controller from a frame buffer of the CPU, the CPU being a main processor of the data processing system that hosts the OS of the data processing system, and the management controller comprises a processor that is separate and independent from the main processor of the data processing system.

After the failure or the graceful shutdown of the OS, the data processing system is retained in a powered-on state despite the failure or the graceful shutdown of the OS.

The method may further comprise, and prior to obtaining the indication: making a first determination, by the management controller, that the peripheral device comprises a peripheral device OS, the peripheral device OS being separate from the OS of the data processing system; and causing, by the management controller and in response to the first determination, a complex programmable logic device (CPLD) coupled to a processor of the data processing system to change a peripheral device power configuration of the data processing system such that a host system power supplied to the peripheral device by the data processing system through the CPLD is not cut off when the change in the state of the OS occurs.

The first determination is performed by the management controller at a startup of the data processing system or when the management controller detects that a new peripheral device is connected to the data processing system.

The method may further include: making a second determination, by the management controller, that the peripheral device has completed the graceful shutdown of the peripheral device OS; and causing, by the management controller and in response to the second determination, the CPLD to stop supplying the host system power to the peripheral device.

Obtaining the indication may include: monitoring, by the management controller, a frame buffer of a processor of the data processing system that hosts the OS of the data processing system for log data indicative of the change in the state of the OS of the data processing system.

A non-transitory media may include instructions that when executed by a processor cause the computer-implemented method to be performed.

A management controller of a data processing system may include the non-transitory media and a processor, and may perform the computer-implemented method when the processor executes the instructions in the non-transitory media.

Turning to FIG. 1A, a block diagram illustrating a system 100 in accordance with an embodiment is shown. The system 100 shown in FIG. 1A may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may include any number of data processing systems 102A-102N. Data processing systems 102A-102N may provide the computer implemented services to users of data processing systems 102A-102N and/or to other devices (not shown). Different data processing systems 102A-102N may provide similar and/or different computer implemented services. These data processing systems 102A-102N may be organized in one or more deployments 101 (e.g., server farms, remote storage environments, Cloud-RAN deployments, or the like) to collectively provide the computer implemented services.

To provide the computer implemented services, data processing systems 102A-102N may include various hardware components (e.g., processors, memory modules, storage devices, peripheral devices, etc.) and host various software components (e.g., operating systems, application, startup managers such as basic input-output systems, etc.). These hardware and software components (discussed in more detail below in FIG. 1B) may provide the computer implemented services via their operation.

The software components may be implemented using various types of services. For example, each data processing system of the data processing systems 102A-102N may host various services that provide the computer implemented service (e.g., application services) and/or that manage the operation of these services (e.g., management services). The aggregate (e.g., combination) of the management and application services may be a complete service that provide desired functionalities.

To manage the data processing systems 102A-102N, the system of FIG. 1A may include data processing system manager 110. Data processing system manager 110 may include various hardware components (e.g., processors, memory modules, storage devices, peripheral devices, etc.) and host various software components (e.g., operating systems, application, startup managers such as basic input-output systems, etc.). These hardware and software components may provide the functionalities (e.g., the communication with and management of the data processing systems) of the data processing system manager 110.

In one example, the data processing system manager 110 may be a computing device (e.g., computing device of FIG. 4) such as a desktop computer or server that is used by used by manufacturers (or distributors, administrators, etc.) of one or more components installed within the data processing systems 102A-102N to communicate with and manage (namely, the components installed within) the data processing systems 102A-102N.

In embodiments, the data processing system manager 110 may also communicate directly with a management controller (discussed in more detail below in FIGS. 1B and 1E) installed within any of the data processing systems 102A-102N. Such communications may be available through one or more application-based services (e.g., application programming interface (API) based services such as Dell®'s Redfish API or the like) providing wireless communication capabilities (e.g., through web servers and/or services, or the like). The data processing system manager 110 may also be provided with a BMC graphical user interface (GUI) for receiving inputs (e.g., commands, files, and other type of data) from a user to be communicated to the management controller. Other types of communication interfaces, protocols, and/or channels (including command line interfaces (CLI) or the like) may also be used to facilitate communication between the management controller and the data processing system manager 110 without departing from the scope of embodiments disclosed within.

Any of the components illustrated in FIG. 1A may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the Internet Protocol).

While FIG. 1A is illustrated as including a limited number of specific components, a system in accordance with an embodiment may include fewer, additional, and/or different components than those illustrated therein.

Turning to FIG. 1B, a diagram illustrating data processing system 140 in accordance with an embodiment is shown. Data processing system 140 may be similar to any of the data processing systems (e.g., any one of data processing systems 102A-102N) shown in FIG. 1A.

To provide computer implemented services, data processing system 140 may include any quantity of hardware resources 150. Hardware resources 150 may be in-band hardware components, and may include a processor operably coupled to memory, storage, and/or other hardware components. These hardware resources 150 (in addition to network module 160, management controller 152, power source 165, power manager 166, and the other components shown in FIG. 1B) may be the default hardware components that are included in the data processing system 140 by a manufacturer of the data processing system 140. However, it could be appreciated that the default hardware components may include more (or less) of what is shown in FIG. 1B.

The processor (e.g., a central processing unit (CPU) chip installed on a motherboard, or the like) may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer implemented services. The applications may utilize various services provided by the management entities and use (at least indirectly) the network stack to communication with other entities.

In embodiments, the processor (of the hardware resources 150) may be a main processor of the data processing system 140. The processor (of the hardware resources 150), may also be the main processor on which an operating system (OS) of the data processing system 140 is stored and runs.

In embodiments, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 140) to another device via any number of intermediate networks (e.g., via wired/wireless channels 176 that are part of the networks).

To reduce the likelihood of the applications and/or other in-band entities from being indirectly compromised, data processing system 140 may include management controller 152 and network module 160. Each of these components of data processing system 140 is discussed below.

Management controller 152 may be implemented, for example, using a system on a chip or other type of independently operating computing device (e.g., independent from the in-band components, such as hardware resources 150, of a data processing system 140). For example, management controller 152 may be a baseboard management controller (BMC), or the like.

Management controller 152 may provide various management functionalities for data processing system 140. For example, management controller 152 may monitor various ongoing processes performed by the in-band component, may manage power distribution, thermal management, and/or other functions of data processing system 140. To conduct such monitoring and provide such functions, the management controller 152 may include its own processor (e.g., a second processor separate and operating independently from the main processer of the data processing system).

Additionally, management controller 152 may be operably connected to various components via sideband channels 174 (in FIG. 1B, a limited number of sideband channels are included for illustrative purposes, it will be appreciated that management controller 152 may communication with other components (including peripheral devices installed within the data processing system 140) via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly, processes may be used to facilitate outbound communications from the applications.

Management controller 152 may be operably connected to communication components of data processing system 140 via separate channels (e.g., 172) from the in-band components, and may implement or otherwise utilize a distinct and independent network stack (e.g., TCP/IP). Consequently, management controller 152 may communication with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 140 may include network module 160. Network module 160 may provide communication services for in-band components and out-of-band components (e.g., management controller 152) of data processing system. To do so, network module 160 may include traffic manager 162 and interfaces 164.

Traffic manager 162 may include functionality to (i) discriminate traffic directed to various network endpoints advertised by data processing system 140, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, and/or other types of communication components. These components may support any number of wired/wireless channels 176.

Thus, from the perspective of an external device, the in-band components and out-of-band components of data processing system 140 may appear to be two independent network entities, that may independently addressable, and otherwise unrelated to one another.

To facilitate management of data processing system 140 over time, hardware resources 150, management controller 152 and/or network module 160 may be positioned in separately controllable power domains. By being positioned in these separately power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons. Said another way, as long as the data processing system is connected to a power source (e.g., a batter, a wall outlet, a generator, or the like), management controller 152 may still be powered on and operational while the data processing system itself is in a powered off (e.g., shut down/shut off) state. More specifically, turning off the data processing system 140 (e.g., via a shutdown command) does not also turn off the management controller 152.

To implement the separate power domains, data processing system 140 may include a power source (e.g., 165) that separately supplies power to power rails (e.g., 167, 168) that power the respective power domains. Power from the power source (e.g., one or more power supplies, batteries, or other types of PSUs etc.) may be selectively provided to the separate power rails to selectively power the different power domains. A power manager (e.g., 166) may manage power from power source 165 that is supplied to the power rails. Management controller 152 may cooperate with power manager 166 to manage supply of power to these power domains.

In FIG. 1B, an example implementation of separate power domains using power rails 167-168 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

In addition to the components (e.g., hardware resources 150, network module 160, management controller 152, power source 165, power manager 166, power rails 167-168, components making up channels 170-172 and sideband channels 174, etc.) additional hardware components (e.g., peripheral devices) (not shown in FIG. 1B) may be installed within (or externally to) the data processing system 140.

In embodiments, these peripheral devices may include channel cards (e.g., a fiber channel card, or the like), network interface cards (NICs), graphical processing units (GPU), data processing units (DPUs), radio access network DPUs (RAN-DPUs), digital signal processors (DSPs), or the like and may communicate with the existing components of the data processing system 140 via various interfaces (e.g., one or more Peripheral Component Interconnect Express (PCIe) buses, universal serial buses (USB), or the like).

These peripheral devices may also draw power from the power source 165 in order to provide their functions (e.g., may be powered entirely, or in part, by power supplied from the power source 165 of the data processing system 140). To perform their functionalities, these peripheral devices may also use the limited computing resources of any of the main processor of the data processing system 140 and/or the processor of management controller 152. In embodiments, each of these peripheral devices may also include their own processes and operating systems (OS), which will be described in more detail with reference to FIG. 1F.

Turning to FIG. 1C, a diagram illustrating an example architecture between the main processor, management controller 152, and peripheral devices of the data processing system 140 is shown. As shown in FIG. 1C, the same data processing system 140 is now shown to include (for exemplary purposes only) just the main processor (e.g., in the form of main processor 180 that includes the basic input/output system (BIOS) (namely, a startup manager) of the data processing system 140), management controller 152, and one or more peripheral devices 182A-182N.

Each of the peripheral devices 182A-182N may be an add-on and/or expansion component (namely, hardware component) such as channel cards (e.g., a fiber channel card, or the like), network interface cards (NICs), graphical processing units (GPU), data processing units (DPUs) (e.g., RAN-DPUs, or the like), digital signal processors (DSPs), or the like. Each of the peripheral devices 182A-182N may include its own processor (namely, a third processor separate from the main processor(s) of the data processing system 140 and the (second) processor(s) of the management controller 152) and its own memory (separate from that of the data processing system's 140 and that of the management controller's 152) storing the peripheral devices' firmware or the like.

As shown in FIG. 1C and discussed above in reference to FIG. 1B, the management controller 152 communicates (e.g., exchanges data) with the main processor 180 via sideband channels 174. The main processor 180 in turn is connected to and communicates (e.g., exchanges data) with the peripheral devices 182A-182N using physical communication bus(es) such as one or more PCIe Buses 183. Other types of physical communication bus(es) besides PCIe Bus 183 (or even virtual connections) may be used depending on the default communication interface(s) and/or connection interface(s) of the peripheral devices 182A-182N without departing from the scope of embodiments disclosed herein.

As further shown in FIG. 1C, the management controller 152 may be connected to and communicate (e.g., exchanges data) with the peripheral devices 182A-182N via sideband channels 174 that are different from the PCIe Bus 183 (and/or the other communication bus(es) connecting the main processor 180 to the peripheral devices 182A-182N). Such sideband channels 174 may be configured using physical and/or virtual paths (e.g., connections) between the management controller 152 and the peripheral devices 182A-182N. For example, such sideband channels 174 may be composed of PCIe buses (or other appropriate communication bus(es)) separate from the ones that connect the startup manager to the peripheral devices 182A-182N. Such sideband channels 174 may also be implemented using inter-integrated circuit (i2c) based communication channels, interfaces, and/or protocols. Even further, such sideband channels 174 may also be implemented using a PCIe vendor defined messaging (VDM) channel. Data (e.g., data packets, instructions, commands, or the like) sent to the peripheral devices 182A-182N over the i2c based communication channels and/or the PCIe VDM channels may be configured and communicated using a management component transport protocol (MCTP).

Other types of data transport protocols and communication interfaces, channels, and/or protocols not described above may also be used for establishing communication between the management controller 152 and the peripheral devices 182A-182N (e.g., via the sideband channels 174) without departing from the scope of embodiments disclosed herein.

Furthermore, in summary, the management controller 152 is configured to communicate with the peripheral devices 182A-182N using a communication channel different from a communication channel used by the main processor 180 to communicate with the peripheral devices 182A-182N. For example, assume that there is only a single peripheral device 182A within the data processing system 140. Further assume that this single peripheral device 182A is connected to the main processor 180 via a PCIe bus (i.e., a first PCIe bus). Even further assume that the management controller 152 is also connected to the single peripheral device via a PCIe bus (i.e., a second PCI bus). In this example, the first PCIe bus would be a completely separate and distinct component (e.g., hardware component) from the second PCIe bus. Said another way, in this example, there would be two separate PCIe buses (e.g., two communication interfaces) that each respectively (and separately) connects the main processor 180 and the management controller 152 to the single peripheral device 182A. More specifically, albeit the same type(s) of communication medium(s) being used, the main processor 180 and the management controller 152 do not share the same communication medium(s) (e.g., the communication interface(s)) themselves and communication path(s) to communicate with the peripheral devices 182A-182N.

As a result, the management controller 152 may advantageously obtain (e.g., retrieve, receive, or the like) data from and issue commands (i.e., instructions) to the peripheral devices 182A-182N without ever having to go through (e.g., utilize) the main processor 180 of the data processing system 140.

Turning now to FIG. 1D, a diagram illustrating another example of the data processing system 140 in accordance with an embodiment is shown. In addition to the components shown in FIG. 1D, the data processing system 140 of FIG. 1D may include all of the components shown in FIG. 1B. In particular, the data processing system 140 of FIG. 1D is shown with only two components (e.g., the main processor 180 and a complex programmable logic device (CPLD) 184) to avoid clutter in the figures.

As shown in FIG. 1D, in addition to the main processor 180, the data processing system 140 may include CPLD 184 (e.g., as part of the hardware resources 150 shown in FIG. 1B). The CPLD 184 may be configured to control how the host power of the data processing system 140 is supplied to the other hardware resources 150 of the data processing system 140. The CPLD 184 may also be configured to control any of the hardware resources 150 based on one or more configurations provided by the user. Additional functions of the CPLD 184 will be described below in FIGS. 2A-2C. Any other types of programmable logic devices may be used instead of a CPLD without departing from the scope of embodiments disclosed herein.

Figure 1E:
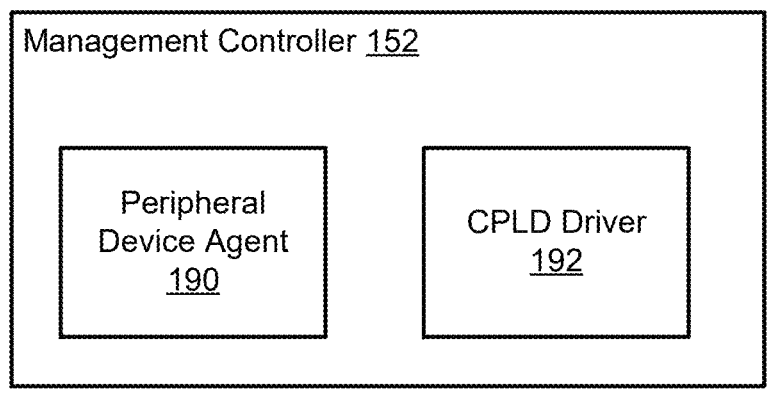
FIG. 1E shows a block diagram illustrating a management controller in accordance with one or more embodiments.

Turning now to FIG. 1E, a management controller 152 of data processing system 140 in accordance with an embodiment is shown. As shown in FIG. 1E, the management controller 152 may include a peripheral device agent 190 and a CPLD driver 192.

In embodiments, the peripheral device agent 190 of the management controller may be implemented using hardware, software, or a combination of both. The peripheral device agent 190 may be configured to manage the one or more peripheral devices 182A-182N of the data processing system 140 (e.g., through the performance of any and all of the operations discussed below in reference below to FIGS. 2A and 3C).

In embodiments, the CPLD driver 192 may also be implemented using hardware, software, or a combination of both. The CPLD driver 192 may be configured to control the CPLD 184 of the data processing system 140 (e.g., via performance of any of all of the operations discussed below in reference to FIGS. 2A-3C).

Although they are shown as two separate components in FIG. 1E, the peripheral device agent 190 and the CPLD driver 192 of the management controller 152 may be configured as a single (combined) component configured to include the functions of both components without departing from the scope of embodiments disclosed herein.

Figure 1F:
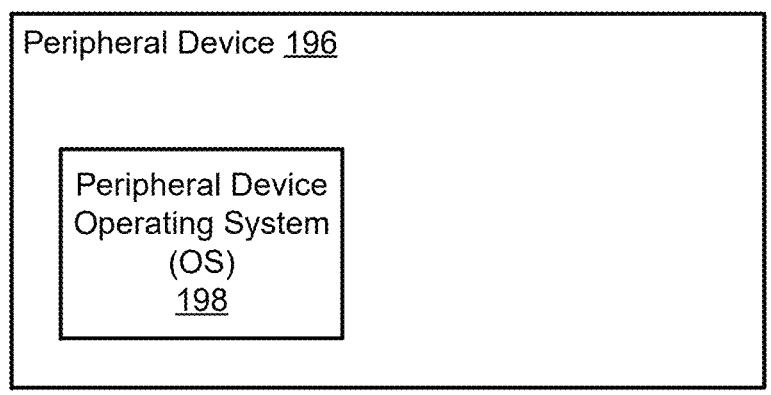
FIG. 1F shows a block diagram illustrating a peripheral device in accordance with one or more embodiments.

Turning now to FIG. 1F, a peripheral device 196 in accordance with an embodiment is shown. Peripheral device 196 may be any of the peripheral devices 182A-182N shown in FIG. 1C. As shown in FIG. 1F, peripheral device 196 includes a peripheral device operating system (OS) 198.

In embodiments, the peripheral device OS 198 may be a separate and independent OS from the host OS running on the main processor 180 of the data processing system 140. The peripheral device OS 198 may also be a separate and independent OS from any OSs executing on the management controller 152.

The peripheral device OS 198 may be hosted by a processor of the peripheral device 196. The processor of the peripheral device 196 may be a system on a chip (SoC), or any other similar device capable of hosting the peripheral device OS 198 and of managing operations of the peripheral device 196 (e.g., managing processes implemented by the peripheral device 196 to provide the functions and/or computer-implemented services associated with the peripheral device 196 (e.g., the network functions and services associated with RAN-DPUs or the like)).

The processor of the peripheral device 196 is also separate and independent from the main processor 180 of the data processing system and any processors of the management controller 152. Said another way, if the main processor 180 is a first processor of the data processing system 140 and the processor(s) of the management controller 152 are a second processor of the data processing system, the processor of peripheral device 196 will be a third (and different) processor of the data processing system.

Figure 2A:
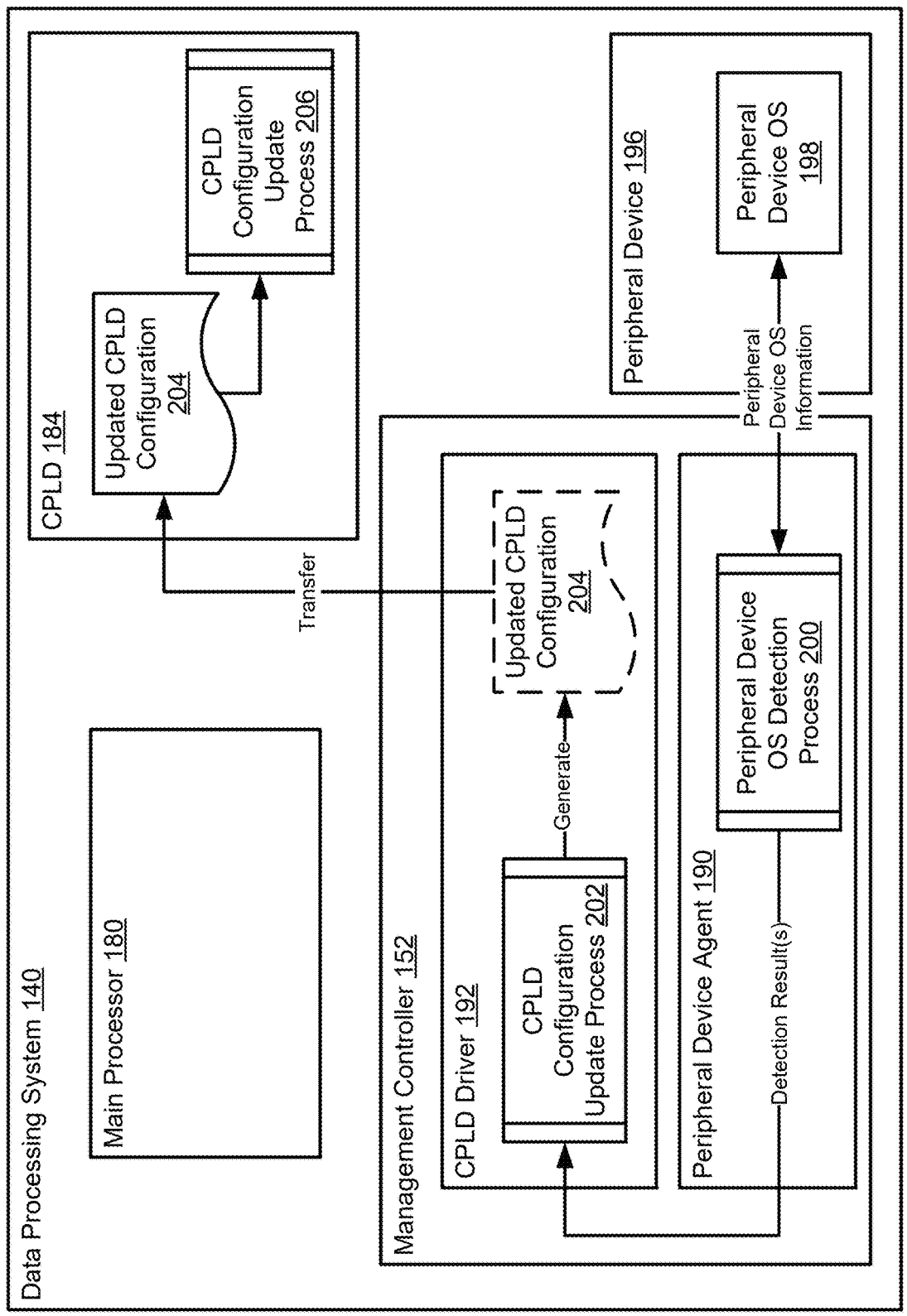
FIGS. 2A-2C show data flow diagrams in accordance with one or more embodiments.
Figure 2B:
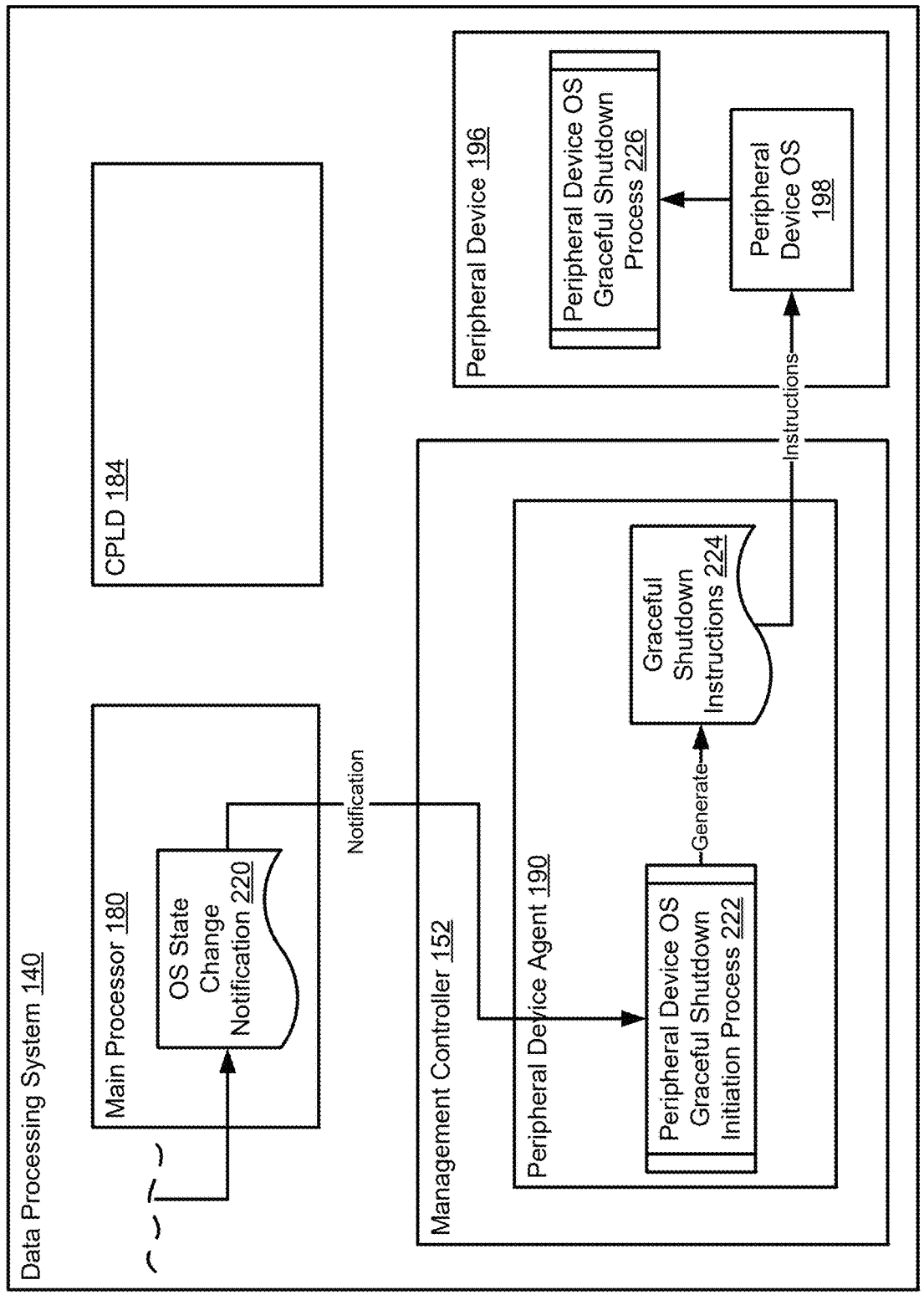
Figure 2C:
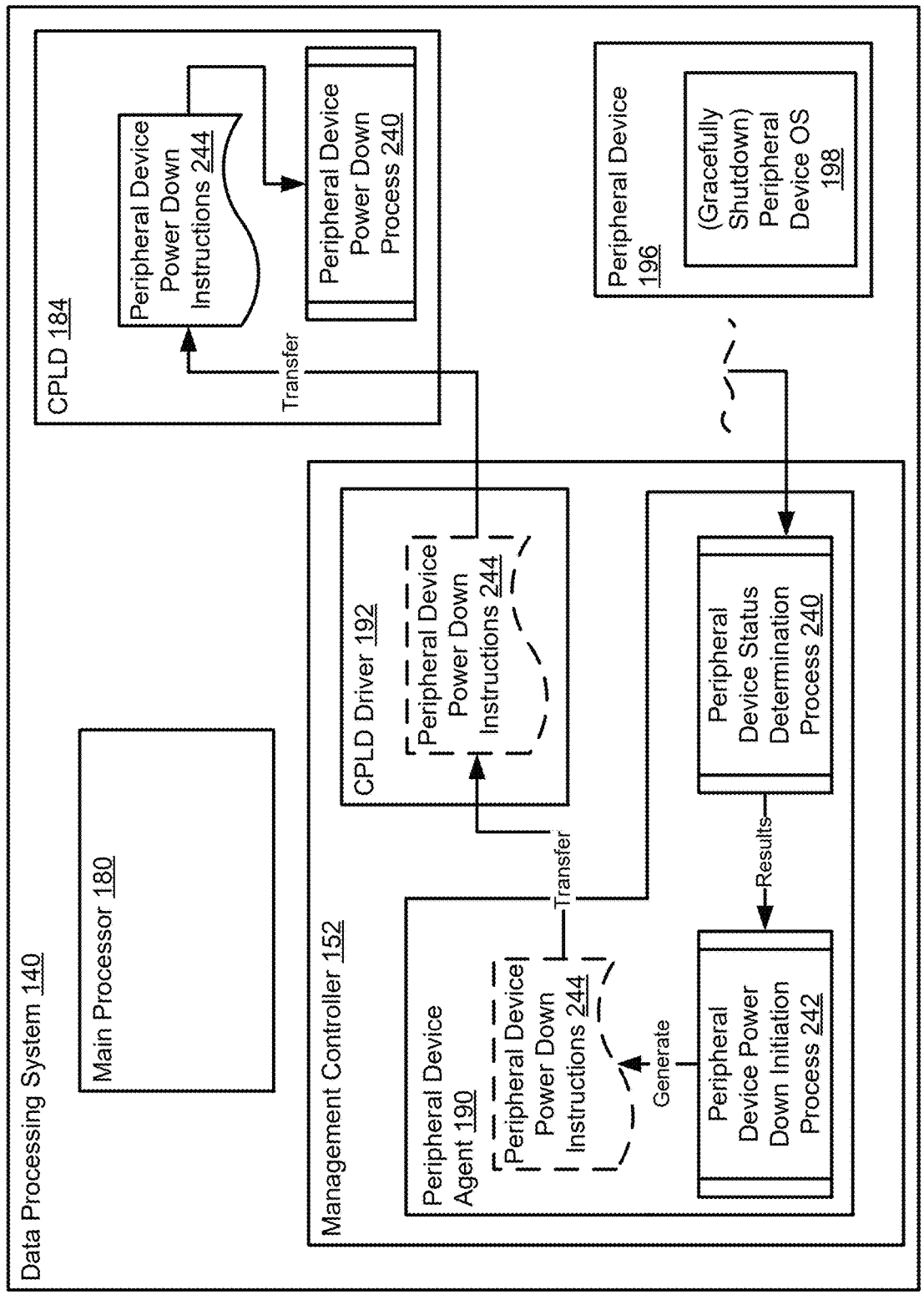

To further clarify embodiments disclosed herein, data flow diagrams in accordance with one or more embodiments disclosed herein is shown in FIG. 2A-2C. In these diagrams, flows of data and processing of data are illustrated using different sets of shapes. A first set of shapes (e.g., 204, 220, 224, etc.) is used to represent data structures (e.g., files, data packets, or the like), a second set of shapes (e.g., 200, 202, 206, etc.) is used to represent processes performed using and/or that generate data, and a third set of shapes (e.g., 196, 152, 180, 184, etc.) is used to represent the components (e.g., the devices, hardware and/or software components, or the like discussed above in reference to FIGS. 1A-1F) that perform the processes shown using the second set of shapes.

Turning now to FIG. 2A, a first data flow diagram is shown for configuring a data processing system 140 to allow for graceful shutdown of a connected peripheral device 196 in accordance with one or more embodiments disclosed herein. As shown in FIG. 2A, the peripheral device agent 190 may perform peripheral device OS detection process 200 to determine whether peripheral device 196 has a peripheral device OS that can be gracefully shutdown (namely, in the event of a system host failure of the data processing system 140).

In embodiments, as part of peripheral device OS detection process 200, the peripheral device agent 190 may utilize the sideband channels (e.g., 174, FIG. 1C) between the management controller 152 and the peripheral device 196 to exchange information (e.g., peripheral device OS information, or the like) with the peripheral device 196 to determine whether the peripheral device 196 has an operating system (e.g., peripheral device OS 198)). In embodiments, such exchange of information may be by way of a network controller sideband interface (NC-SI) command to the peripheral device 196.

Other methods aside from the NC-SI commands can be utilized by the peripheral device agent 190 (as part of peripheral device OS detection process 200) to determine whether the peripheral device 196 has an operating system without departing from the scope of embodiments disclosed herein. For example, the peripheral device agent 190 may retrieve device information (e.g., original equipment manufacturer (OEM) information, or the like) of the peripheral device 196 from, for example: the BIOS of the data processing system 140, the data processing system manager 110, or directly from the peripheral device 196.

Once the peripheral device agent 190 knows that the peripheral device 196 has the peripheral device OS 198, the peripheral device agent 190 may mark peripheral device 196 as being capable of a graceful shutdown.

Additionally, the peripheral device agent 190 may convey the detection result(s) of peripheral device OS detection process 200 to the CPLD driver 192. The detection result(s) from the peripheral device agent 190 may be used by the CPLD driver 192 as part of CPLD configuration update process 202.

In embodiments, as part of CPLD configuration update process 202, the CPLD driver 192 generates an updated CPLD configuration to update configurations of the CPLD 184 of the data processing system. Once generated the updated CPLD configuration 204 is provided by the CPLD driver 192 of the management controller 152 to the CPLD 184 (e.g., the CPLD driver 192 uses the updated CPLD configuration 204 to update a configuration of the CPLD 184).

In embodiments, the updated CPLD configuration 204 may include a peripheral device power configuration for the peripheral device 196. The peripheral device power configuration may be applied to CPLD 184 as part of the update of the configuration of the CPLD 184 such that a host system power supplied to the peripheral device 196 by the data processing system through the CPLD 184 is not cut off when a change to the state of the system host occurs (e.g., when a failure or crash of the host OS of the data processing system occurs that would cause an abrupt powering off of the peripheral device 196). Application of the peripheral device power configuration (as part of CPLD configuration updated process 206) may also allow the management controller 152 to now control the powering of the peripheral device 196 through CPLD 184.

The CPLD 184 applies the updated CPLD configuration 204 as part of CPLD configuration update process 206 to update the configuration of the CPLD 184 to include the peripheral device power configuration. As a result of the update through CPLD configuration update process 206, power (e.g., host power) to the peripheral device 196 will advantageously no longer be cut off when the system host experiences a change of state that would normally cause power to the peripheral device 196 to be cut off. Said another way, when the CPLD 184 is informed of a crash (or other change in state of the system host of the data processing system 140), instead of cutting off power to the peripheral device 196 as soon as the crash is detected, the CPLD will continue to provide power to the peripheral device until it is told to do otherwise by the management controller 152 (namely, the CPLD driver 192 of the management controller).

Turning now to FIG. 2B, a second flow diagram is shown for causing (e.g., by management controller 152) a peripheral device 196 to perform a graceful shutdown in accordance with one or more embodiments disclosed herein. Processes shown in the second data flow diagram of FIG. 2B may occur at any point after the CPLD configuration update process 206 is completed in FIG. 2A to set up the peripheral device 196 to be able to perform the graceful shutdown.

In particular, at any time after CPLD 184 has been configured to apply the peripheral device power configuration for peripheral device 196, an OS state change notification 220 (e.g., a notification with regard to a change in a state of the OS) may be generated by the main processor 180 of the data processing system 140. The OS state change notification 220 may include information indicative of: (i) a crash (e.g., failure) of the system host (e.g., OS hosted by main processor 180) of the data processing system; (ii) a graceful shutdown of the system host; or (iii) any other type of state change to the system host that would normally cause an abrupt powering off of all components (including the peripheral device 196) of the data processing system 140.

In embodiments, because the management controller 152 operates and is powered independently of the data processing system, such change in state change to the system host that would normally cause an abrupt powering off of all components of the data processing system 140 will not affect the operations of the management controller 152.

In embodiments, the OS state change notification 220 may be provided to the peripheral device agent 190 of the management controller 152 via a platform controller hub (PCH) coupled to the main processor 180 (e.g., as part of the motherboard of the data processing system 140). The PCH may receive the OS state change notification 220 (e.g., as system host logs) from a frame buffer included in one or more memory (e.g., random access memory (RAMs)) coupled to the main processor 180.

Alternatively or in addition, the peripheral device agent 190 of the management controller 152 may also be configured to constantly (e.g., at predetermined intervals set by a user and/or administrator of the data processing system 140 and/or the data processing system manager 110) monitor a health (e.g., heartbeat) of the system host for such state changes to the system host that would normally cause an abrupt powering off of all components (besides the management controller 152) of the data processing system 140. For example, the peripheral device agent 190 may continuously check data (e.g., system host crash logs, graceful shutdown commands, or the like) stored in the frame buffer included in the RAM(s) coupled to the main processor 180.

Once the OS state change notification 220 is provided to peripheral device agent 190, peripheral device agent 190 may perform peripheral device OS graceful shutdown initiation process 222. As part of peripheral device OS graceful shutdown initiation process 222, peripheral device agent 190 may generate graceful shutdown instructions 224.

In embodiments, the graceful shutdown instructions 224 may be generated as one or more NC-SI commands using MCTP, and then subsequently provided to (e.g., transmitted to) the peripheral device 196 over the i2c or PCIe-VDM channels connecting the management controller 152 to the peripheral device 196. The one or more NC-SI commands may include any number of shutdown commands required for the peripheral device to start and complete a graceful shutdown of the peripheral device OS 198.

Other types of data configuration and transport protocols may be used to generate and provide the graceful shutdown instructions 224 to the peripheral device 196 without departing from the scope of embodiments disclosed herein.

Once the graceful shutdown instructions 224 are received by the peripheral device OS 198, the peripheral device OS 198 initiates (e.g., starts) performance of peripheral device OS graceful shutdown process 226 to initiate and complete a graceful shutdown of the peripheral device 196 (namely, of the peripheral device OS 196).

In the event that a peripheral device does not include an OS but does include firmware, the graceful shutdown instructions 224 may be provided to the peripheral device to shut down the peripheral device's firmware. The same peripheral device power configuration (through the CPLD) discussed in reference in FIG. 2A would also be implemented such that the peripheral device with only firmware (and no OS) would not be abruptly shut down as a result of the host system state change that has occurred in FIG. 2B.

As part of the peripheral device OS graceful shutdown process 226, the peripheral device 196 may (e.g., by way of the peripheral device OS 198) shutdown by: (i) terminating all running processes, services, and/or operations and applications; and (ii) completing all input/output (I/O) operations and transitions itself to a shutdown state. Other processes not described here may also be performed as part of the graceful shutdown of the peripheral device OS 198 without departing from the scope of embodiments disclosed herein.

Turning now to FIG. 2C, a third flow diagram is shown for powering off a peripheral device 196 that has completed a graceful shutdown in accordance with one or more embodiments disclosed herein.

As shown in FIG. 2C, peripheral device agent 190 of management controller 152 may perform peripheral device status determination process 240 to confirm whether the peripheral device 196 has completed the graceful shutdown of the peripheral device OS 198. As part of peripheral device status determination process 240, the peripheral device agent 190 may yet again provide NC-SI commands to the peripheral device 196 to determine whether any response will be received from the peripheral device 196.

Alternatively or in addition, as part of completing the graceful shutdown process, the peripheral device OS 198 may transmit a completion notification to the peripheral device agent 190. Such completion notification would then be used as part of peripheral device status determination process 240 to confirm that the peripheral device 196 has completed the graceful shutdown of the peripheral device OS 198.

As shown in FIG. 2C, the results of the peripheral device status determination process 240 (e.g., a confirmation that the peripheral device 196 has completed the graceful shutdown of the peripheral device OS 198) may be provided to peripheral device power down initiation process 242 of peripheral device agent 190.

As part of peripheral device power down initiation process 242, the peripheral device agent 190 may generate peripheral device power down instructions 244 that are provided to the CPLD 184 through CPLD driver 192 of the management controller. In particular, the peripheral device power down instructions 244 may include CPLD configurations (to be applied by the CPLD 184) to power off the gracefully shutdown peripheral device.

More specifically, the CPLD 184 uses peripheral device power down instructions 244 (e.g., namely, the configurations included in the peripheral device power down instructions 244) as an indication (e.g., command) form the management controller 152 that it is now safe to power down (e.g., to stop providing host power to) the now gracefully shutdown peripheral device 196. The CPLD 184 may power off (e.g., terminate host power to) the peripheral device 196 completely as part of peripheral device power down process 240.

In embodiments, once the peripheral device 196 has been gracefully shutdown and completely powered off, the management controller 152 may notify the main processor 180 that is now safe to start a power cycling of the data processing system to reset and/or restart the data processing system 140 as to complete a recover of the data processing system 140 from the change in state of the system host. Additionally, the management controller 152 may also inform users of the data processing system 140 (via causing the data processing system manager 110 to display a notification) of the graceful shutdown of the peripheral device. The management controller 152 may inform the users via display of lifecycle controller log messages, or the like.

Any of the processes illustrated using the second set of shapes (shown in FIGS. 2A-2C) may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Figure 3A:
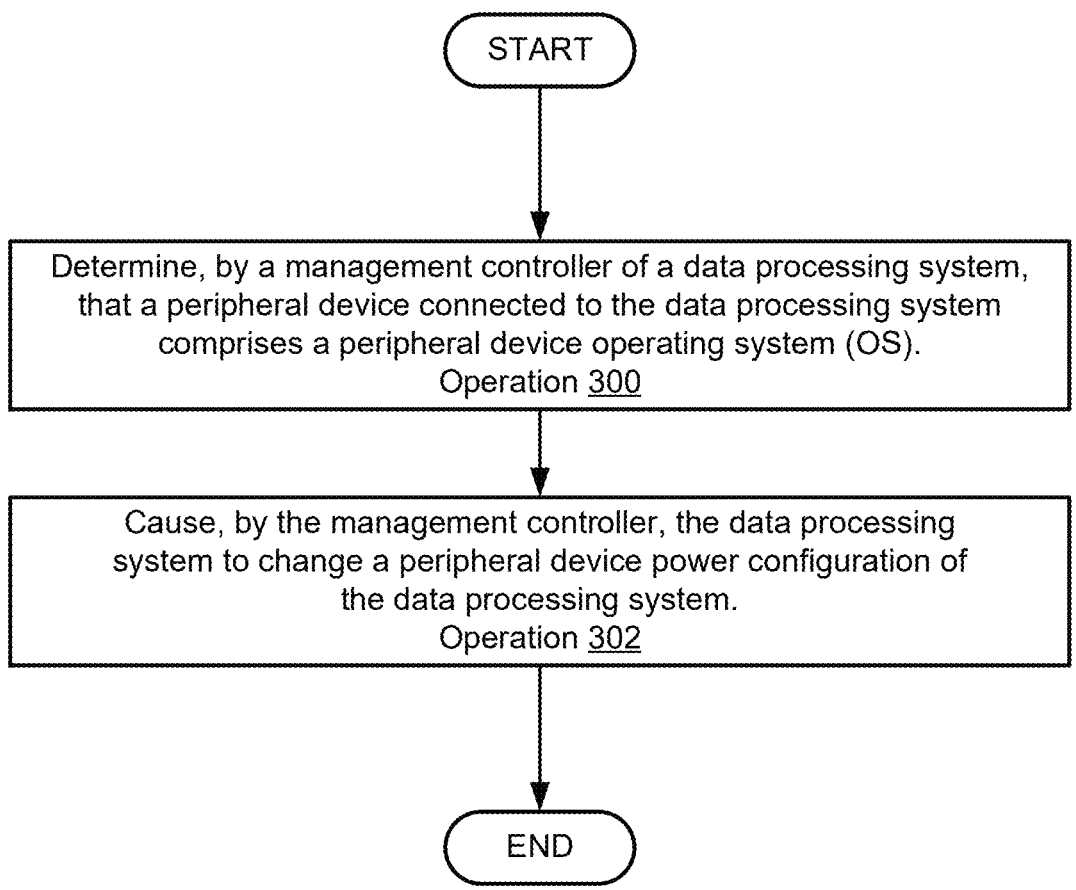
FIG. 3A-3C show flowcharts in accordance with one or more embodiments.
Figure 3B:
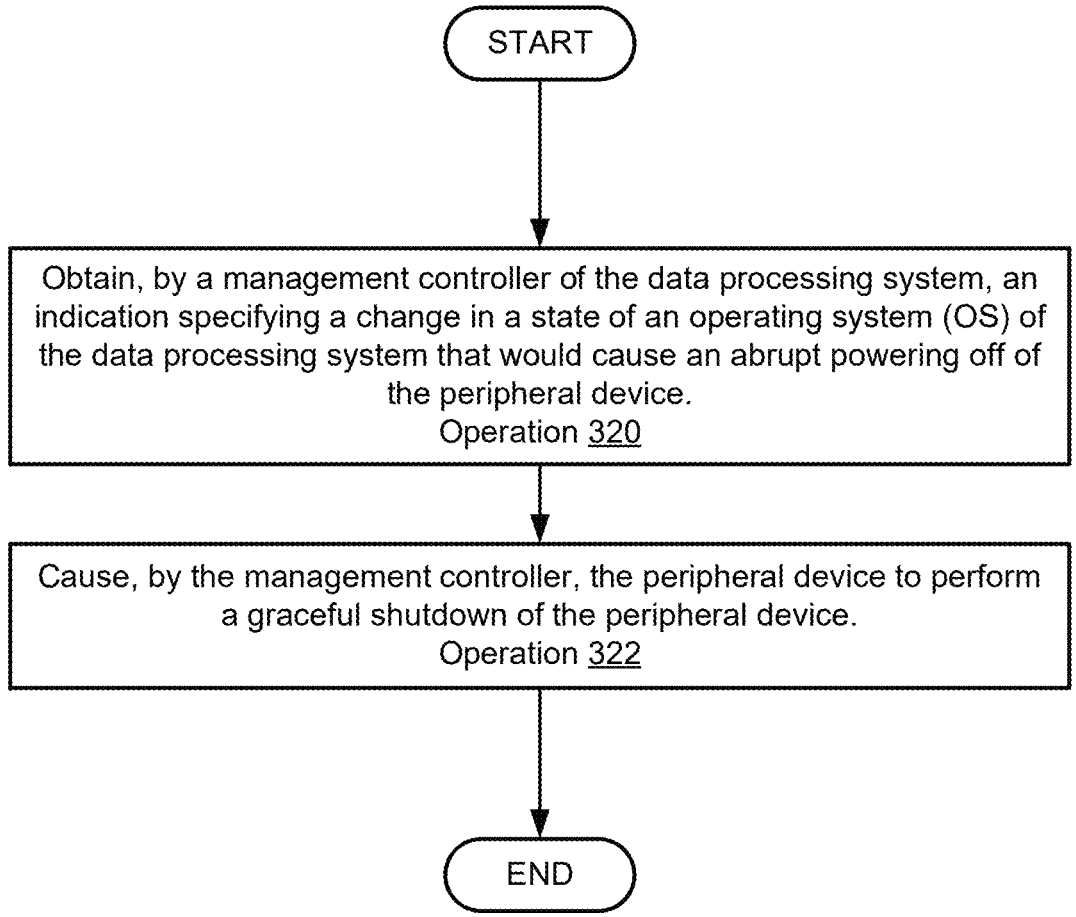
Figure 3C:
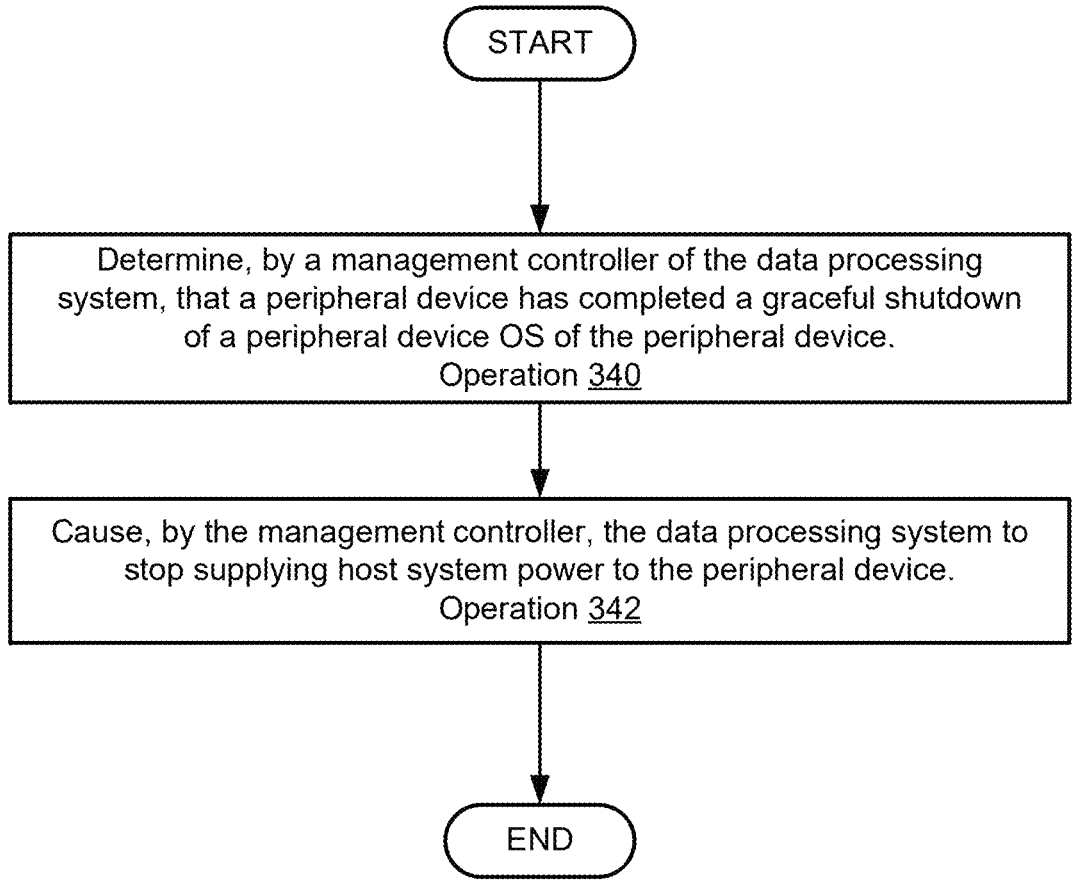

As discussed above, the components of FIGS. 1A-2C may perform various methods for managing a boot up process of a data processing system. FIGS. 3A-3C illustrate example methods that may be performed by the components of FIGS. 1A-2C. For example, any of the data processing systems 102A-102N, and/or the data processing system manager 110 shown in FIG. 1A may perform all or a portion of the methods. In the diagram discussed below and shown in FIGS. 3A-3C, any of the operations may be repeated, performed in different orders, and/or performed in parallel with or in a partially overlapping in time manner with other operations.

Starting with FIG. 3A, in Operation 300 and as discussed above in reference to FIGS. 2A and 2B, a management controller of a data processing system may determine that a peripheral device connected to the data processing system comprises a peripheral device operating system (OS).

In embodiments, the management controller may also determine that the peripheral device does not include a peripheral device OS but does include firmware.

In response to the determination in Operation 300, in Operation 302 and as discussed above in reference to FIG. 2A, the management controller may cause (e.g., via a peripheral device agent and a CPLD driver of the management controller) the data processing system to change a peripheral device power configuration of the data processing system.

In embodiments, as part of the peripheral device power configuration, the data processing system (namely, a CPLD of the data processing system) is instructed (e.g., configured) by the management controller to maintain host power to the peripheral device with the peripheral device OS (or firmware) until the peripheral device has completed a graceful shutdown of the peripheral device OS (or firmware).

The method of FIG. 3A may end following Operation 302.

Turning now to FIG. 3B, at any point in time after Operation 302 in FIG. 3A has been completed, in Operation 320 and as discussed above in reference to FIG. 2B, the management controller of the data processing system may obtain an indication specifying a change in a state of an operating system (OS) of the data processing system that would cause an abrupt powering off of the peripheral device.

In embodiments, the change in the state of the OS of the data processing system may include at least a failure of the OS and a graceful shutdown of the OS. The indication may be received by the management controller from a frame buffer of the CPU, the CPU being a main processor of the data processing system that hosts the OS of the data processing system. The management controller may also continuously monitor the frame buffer of the CPU for information indicative of the change in a state of the OS of the data processing system.

In embodiments, after the failure or the graceful shutdown of the OS of the data processing system, the data processing system is retained in a powered-on state despite the failure or the graceful shutdown of the OS. Said another way, also the OS is no longer operating, power is still being supplied from the power supply of the data processing system to the components (including the management controller) of the data processing system. For example, the data processing system may be retained in a crashed state (e.g., a blue screen of death state or the like).

In Operation 322, and as discussed above in reference to FIG. 2B, the management controller may cause the peripheral device to perform a graceful shutdown of the peripheral device.

In embodiments, graceful shutdown instructions may be generated by the management controller as one or more NC-SI commands using MCTP, and then subsequently provided to (e.g., transmitted to) the peripheral device over the i2c or PCIe-VDM channels connecting the management controller to the peripheral device. The one or more NC-SI commands may include any number of shutdown commands required for the peripheral device to start and complete a graceful shutdown of the peripheral device OS.

In embodiments, the peripheral device may use the graceful shutdown instructions received from the management controller to gracefully shutdown the peripheral device OS (or firmware).

The method of FIG. 3B may end following Operation 322.

Turning now to FIG. 3C, at any time after the management controller has caused the peripheral device to perform the graceful shutdown in Operation 322 of FIG. 3B, in Operation 340 of FIG. 3C and as discussed above in reference to FIG. 2C, the management controller of the data processing system may determine that the peripheral device has completed a graceful shutdown of the peripheral device's peripheral device OS.

In Operation 342, in response to the determination in Operation 340 and as discussed above in reference to FIG. 2C, the management controller may cause the data processing system (e.g., via the CPLD of the data processing system) to stop supplying host system power to the peripheral device.

In embodiments, once the peripheral device is completely powered off, the data processing system may be (e.g., as caused by the management controller) power cycled to resolve the and/or recover from the change in state of the OS detected in Operation 320 of FIG. 3B.

As part of the power cycling of the data processing system, the peripheral device may also be power cycled and restarted (e.g., turned back on) when the data processing system is also restarted.

The method of FIG. 3C may end Operation 342.

Any of the components illustrated in FIGS. 1A-3C may be implemented with one or more computing devices. Turning to FIG. 4, a block diagram illustrating an example of a computing device (also referred to herein as "system 400") in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a peripheral device of a data processing system, the method comprising:
    obtaining, by a management controller of the data processing system, an indication specifying a change in a state of an operating system (OS) of the data processing system that would cause an abrupt powering off of the peripheral device by at least:
        monitoring, by the management controller, a frame buffer of a first processor of the data processing system that hosts the OS the data processing system for log data indicative of the change in the state of the OS of the data processing system; and
    causing, by the management controller, the peripheral device to perform a graceful shutdown of the peripheral device while preventing the abrupt powering off of the peripheral device as a result of change in the state of the OS of the data processing system.

2. The method of claim 1, wherein the change in the state of the OS of the data processing system comprises at least a failure of the OS and a graceful shutdown of the OS.

3. The method of claim 2, wherein the management controller is a microcontroller installed within the data processing system that operates independently of a central processing unit (CPU) of the data processing system, the first processor being the CPU, and the peripheral device is a data processing unit (DPU).

4. The method of claim 3, wherein the management controller communicates with and causes the peripheral device to perform actions using an inter-integrated circuit (i2c) communication interface between the management controller and the peripheral device, the actions comprising the graceful shutdown of the peripheral device.

5. The method of claim 3, wherein the indication is received by the management controller from the frame buffer of the CPU, the CPU being a main processor of the data processing system that hosts the OS of the data processing system, and the management controller comprises a second processor that is separate and independent from the main processor of the data processing system.

6. The method of claim 2, wherein after the failure or the graceful shutdown of the OS, the data processing system is retained in a powered-on state despite the failure or the graceful shutdown of the OS.

7. The method of claim 1, further comprising and prior to obtaining the indication:
    making a first determination, by the management controller, that the peripheral device comprises a peripheral device OS, the peripheral device OS being separate from the OS of the data processing system; and
    causing, by the management controller and in response to the first determination, a complex programmable logic device (CPLD) coupled to the first processor of the data processing system to change a peripheral device power configuration of the data processing system such that a host system power supplied to the peripheral device by the data processing system through the CPLD is not cut off when the change in the state of the OS occurs.

8. The method of claim 7, the first determination is performed by the management controller at a startup of the data processing system or when the management controller detects that a new peripheral device is connected to the data processing system.

9. The method of claim 7, further comprising:
making a second determination, by the management controller, that the peripheral device has completed the graceful shutdown of the peripheral device OS; and
causing, by the management controller and in response to the second determination, the CPLD to stop supplying the host system power to the peripheral device.

10. A non-transitory machine-readable medium having instructions stored therein, which when executed by a data processing system, cause the data processing system to perform operations for managing peripheral device of the data processing system, the operations comprising:
obtaining, by a management controller of the data processing system, an indication specifying a change in a state of an operating system (OS) of the data processing system that would cause an abrupt powering off of the peripheral device by at least;
monitoring, by the management controller, a frame buffer of a first processor of the data processing system that hosts the OS for log data indicative of the change in the state of the OS; and
causing, by the management controller, the peripheral device to perform a graceful shutdown of the peripheral device while preventing the abrupt powering off of the peripheral device as a result of change in the state of the OS of the data processing system.

11. The non-transitory machine-readable medium of claim 10, wherein the change in the state of the OS of the data processing system comprises at least a failure of the OS and a graceful shutdown of the OS.

12. The non-transitory machine-readable medium of claim 11, wherein the management controller is a microcontroller installed within the data processing system that operates independently of a central processing unit (CPU) of the data processing system, the first processor being the CPU, and the peripheral device is a data processing unit (DPU).

13. The non-transitory machine-readable medium of claim 12, wherein the management controller communicates with and causes the peripheral device to perform actions using an inter-integrated circuit (i2c) communication interface between the management controller and the peripheral device, the actions comprising the graceful shutdown of the peripheral device.

14. The non-transitory machine-readable medium of claim 12, wherein the indication is received by the management controller from the frame buffer of the CPU, the CPU being a main processor of the data processing system that hosts the OS of the data processing system, and the management controller comprises a second processor that is separate and independent from the main processor of the data processing system.

15. A management controller of a data processing system, the management controller comprising:
a second processor; and
a memory coupled to the second processor, the memory storing instructions that, when executed by the second processor, causes the management controller to perform operations for managing a peripheral device of the data processing system, the operations comprising:
obtaining, by a management controller of the data processing system, an indication specifying a change in a state of an operating system (OS) of the data processing system that would cause an abrupt powering off of the peripheral device by at least;
monitoring, by the management controller, a frame buffer of a first processor of the data processing system that hosts the OS for log data indicative of the change in the state of the OS; and
causing, by the management controller, the peripheral device to perform a graceful shutdown of the peripheral device while preventing the abrupt powering off of the peripheral device as a result of change in the state of the OS of the data processing system.

16. The management controller of claim 15, wherein the change in the state of the OS of the data processing system comprises at least a failure of the OS and a graceful shutdown of the OS.

17. The management controller of claim 16, wherein the management controller is a microcontroller installed within the data processing system that operates independently of a central processing unit (CPU) of the data processing system, the first processor being the CPU, and the peripheral device is a data processing unit (DPU).

18. The management controller of claim 17, wherein the management controller communicates with and causes the peripheral device to perform actions using an inter-integrated circuit (i2c) communication interface between the management controller and the peripheral device, the actions comprising the graceful shutdown of the peripheral device.

19. The management controller of claim 17, wherein the indication is received by the management controller from the frame buffer of the CPU, the CPU being a main processor of the data processing system that hosts the OS of the data processing system, and the second processor of the management controller is separate and independent from the main processor of the data processing system.

20. The management controller of claim 16, wherein after the failure or the graceful shutdown of the OS, the data processing system is retained in a powered-on state despite the failure or the graceful shutdown of the OS.

* * * * *